United States Patent
Hickey et al.

(10) Patent No.: US 9,871,923 B2
(45) Date of Patent: Jan. 16, 2018

(54) SYSTEM AND METHOD FOR MANAGING RESOURCES

(71) Applicant: Avaya Inc., Santa Clara, CA (US)

(72) Inventors: James Hickey, San Jose, CA (US); Tony McCormack, Galway (IE); Paul D'Arcy, Galway (IE); Neil O'Connor, Galway (IE)

(73) Assignee: Avaya Inc., Basking Ridge, NJ (US)

( * ) Notice: Subject to any disclaimer, the term of this patent is extended or adjusted under 35 U.S.C. 154(b) by 0 days.

(21) Appl. No.: 14/552,596

(22) Filed: Nov. 25, 2014

(65) Prior Publication Data

US 2016/0150084 A1    May 26, 2016

(51) Int. Cl.
*H04M 3/00*    (2006.01)
*H04M 3/523*    (2006.01)
*H04M 5/00*    (2006.01)
*H04L 12/66*    (2006.01)

(52) U.S. Cl.
CPC .................................... *H04M 3/523* (2013.01)

(58) Field of Classification Search
CPC .... H04M 3/5183; H04M 3/51; H04M 3/5175; H04M 2201/38; H04M 2201/60; H04M 3/523; H04M 3/42221; H04M 3/5191; H04M 3/5232; H04M 3/36; H04M 3/5238; H04M 2201/50; H04M 2203/2066; H04M 2203/5018; H04M 2203/555; H04L 65/1006; H04L 12/581; H04L 2012/2841; H04L 41/18; H04L 51/04; H04L 41/22; H04L 47/10; H04L 49/25; H04L 51/063

USPC ........ 379/265, 266; 370/352, 353, 354, 355, 370/356, 357
See application file for complete search history.

(56) References Cited

U.S. PATENT DOCUMENTS

| | | | |
|---|---|---|---|
| 6,449,358 B1* | 9/2002 | Anisimov | H04L 29/06 379/266.07 |
| 6,574,605 B1* | 6/2003 | Sanders | G06Q 10/06311 379/265.01 |
| 8,649,499 B1* | 2/2014 | Koster et al. | 379/265.06 |
| 2002/0087393 A1* | 7/2002 | Philonenko | 705/11 |
| 2003/0231647 A1* | 12/2003 | Petrovykh | 370/429 |
| 2004/0151127 A1* | 8/2004 | Chong | 370/252 |
| 2005/0078657 A1* | 4/2005 | Huey | 370/352 |
| 2005/0261895 A1* | 11/2005 | Bauer et al. | 704/216 |
| 2006/0153174 A1* | 7/2006 | Towns-von Stauber et al. | 370/356 |
| 2007/0019618 A1* | 1/2007 | Shaffer et al. | 370/352 |
| 2008/0301282 A1* | 12/2008 | Coleman | 709/224 |

(Continued)

*Primary Examiner* — Fan Tsang
*Assistant Examiner* — Kharye Pope
(74) *Attorney, Agent, or Firm* — Stevens & Showalter, LLP (57) ABSTRACT

A computing system for managing a plurality of resources for one or more communication sessions in an enterprise is disclosed. The computing system includes a monitoring module for monitoring one or more parameters of at least one communication session. The system further includes a database for storing one or more monitored parameters. The system further includes a calculation module for calculating a multiplicity value for each of the plurality of resources based on the stored parameters. The system further includes an allocation module for allocating the at least one communication session to at least one resource of the plurality of resources based on the calculated multiplicity value.

20 Claims, 5 Drawing Sheets

(56) References Cited

U.S. PATENT DOCUMENTS

| | | | |
|---|---|---|---|
| 2012/0297323 A1* | 11/2012 | Lingafelt | G06Q 10/10 715/758 |
| 2014/0071980 A1* | 3/2014 | Kovalenko et al. | 370/352 |
| 2014/0140498 A1* | 5/2014 | Mezhibovsky et al. | 379/265.13 |
| 2014/0270133 A1* | 9/2014 | Conway et al. | 379/265.1 |
| 2015/0030151 A1* | 1/2015 | Bellini | H04M 3/5175 379/265.06 |
| 2015/0131793 A1* | 5/2015 | Riefel | 379/265.06 |

* cited by examiner

SYSTEM AND METHOD FOR MANAGING RESOURCES

BACKGROUND

Field

Embodiments of the present invention generally relate to a system and method to manage resources in an enterprise and particularly to a system and method for managing multiplicity of resources in an enterprise.

Description of Related Art

Contact centers are employed by many enterprises to service, inbound and outbound contacts or customers. A primary objective of contact center management is ultimately to maximize contact center performance and profitability. An ongoing challenge in contact center administration is monitoring and optimizing contact center efficiency usage of its available resources. Generally, the contact center efficiency is measured by metrics such as Service Level Agreement (SLA), Customer Satisfaction (CSAT), and match rate. Contact center resources may include, agents, communication assets (e.g., number of voice trunks, number and bandwidth of video trunks, etc.), computing resources (e.g., a speed, a queue length, a storage space, etc.), and so forth.

Nowadays, resources of the contact center are capable for simultaneously managing multiple incoming contacts (e.g., a voice call, a web chat, an instant messaging, etc.). This capability of the resources may be referred to as 'multiplicity' of resources. Multiplicity factor may allow a resource of the contact center to manage the incoming contacts such as multimedia contacts and a voice or a video contact simultaneously. In conventional techniques, multiplicity values of the resources are computed and stored in a database. However, these computed multiplicity values of the resources are static values. For example, pre-calculated multiplicity value of a resource can be used to assign an incoming contact to a resource of a contact center. Further, supervisors of the contact center are given the ability to specify a number of contacts per channel a resource may manage simultaneously. In addition, the supervisors can also specify the number of contacts on a per skill basis of resources in the contact center. However, due to a static multiplicity value, efficiency of resources of the contact center cannot be maximized. Moreover, statically configured multiplicity configurations may further results in poor efficiency in allowing the contact center to cope up with varying types of incoming contacts, particularly in an omni-channel use cases such as media escalations, i.e., escalating from one media to another media.

There is thus a need for a system and method for dynamically managing multiplicity of resources within a contact center.

SUMMARY

Embodiments in accordance with the present invention provide a computing system for dynamically managing a plurality of resources for one or more communication sessions in an enterprise. The computing system includes a monitoring module for monitoring one or more parameters of at least one communication session. The system further includes a database for storing one or more monitored parameters. The system further includes a calculation module for calculating a multiplicity value for each of the plurality of resources based on the stored parameters. The system further includes an allocation module for allocating the at least one communication session to at least one resource of the plurality of resources based on the calculated multiplicity value.

Embodiments in accordance with the present invention further provide a computer-implemented method for dynamically managing a plurality of resources for one or more communication sessions in an enterprise. The method includes monitoring one or more parameters of at least one communication session; storing the one or more monitored parameters in at least one database; calculating a multiplicity value for each of the plurality of resources based on the stored parameters; and allocating the at least one communication session to at least one resource of the plurality of resources based on the calculated multiplicity value.

Embodiments in accordance with the present invention further provide a computer-implemented method for dynamically allocating at least one communication session to at least one resource in an enterprise. The method includes monitoring one or more parameters of at least one communication session; storing the one or more monitored parameters in at least one database; calculating a multiplicity value for each of the plurality of resources based on the stored parameters; selecting at least one resource of the plurality of resources based on the calculated multiplicity value for each of the plurality of resources; and allocating the at least one communication session to the at least one selected resource.

Embodiments of the present invention may provide a number of advantages depending on its particular configuration. First, embodiments of the present application provide a mechanism whereby a workflow or a business process may dynamically influence multiplicity characteristics of a resource in an enterprise such as, but not limited to, a contact center. Embodiments of the present application also applies equally well to non-contact center use cases where, for example, back office transactions may be automatically routed to knowledge resources within an enterprise.

Further, embodiments of the present application provide a mechanism whereby the core concept of the multiplicity configuration of a resource is state dependent. The state may be a state of a resource, a state of an enterprise, or a state of an incoming contact or a communication session. Next, the system provides a mechanism to move to a more dynamic determination of multiplicity configurations of resources, thereby allowing much greater flexibility.

These and other advantages will be apparent from the present application of the embodiments described herein.

The preceding is a simplified summary to provide an understanding of some embodiments of the present invention. This summary is neither an extensive nor an exhaustive overview of the present invention and its various embodiments. The summary presents selected concepts of the embodiments of the present invention in a simplified form as an introduction to the more detailed description presented below. As will be appreciated, other embodiments of the present invention are possible utilizing, alone or in combination, one or more of the features set forth above or described in detail below.

BRIEF DESCRIPTION OF THE DRAWINGS

The above and still further features and advantages of embodiments of the present invention will become apparent upon consideration of the following detailed description of embodiments thereof, especially when taken in conjunction with the accompanying drawings, and wherein.

The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include", "including", and "includes" mean including but not limited to. To facilitate understanding, like reference numerals have been used, where possible, to designate like elements common to the figures.

DETAILED DESCRIPTION

Embodiments of the present invention will be illustrated below in conjunction with an exemplary communication system, e.g., the Avaya Aura® system. Although well suited for use with, e.g., a system having an Automatic Call Distribution (ACD) or other similar contact processing switch, embodiments of the present invention are not limited to any particular type of communication system switch or configuration of system elements. Those skilled in the art will recognize the disclosed techniques may be used in any communication application in which it is desirable to provide improved contact processing.

The phrases "at least one", "one or more", and "and/or" are open-ended expressions that are both conjunctive and disjunctive in operation. For example, each of the expressions "at least one of A, B and C", "at least one of A, B, or C", "one or more of A, B, and C", "one or more of A, B, or C" and "A, B, and/or C" means A alone, B alone, C alone, A and B together, A and C together, B and C together, or A, B and C together.

The term "a" or "an" entity refers to one or more of that entity. As such, the terms "a" (or "an"), "one or more" and "at least one" can be used interchangeably herein. It is also to be noted that the terms "comprising", "including", and "having" can be used interchangeably.

The term "automatic" and variations thereof, as used herein, refers to any process or operation done without material human input when the process or operation is performed. However, a process or operation can be automatic, even though performance of the process or operation uses material or immaterial human input, if the input is received before performance of the process or operation. Human input is deemed to be material if such input influences how the process or operation will be performed. Human input that consents to the performance of the process or operation is not deemed to be "material".

The term "computer-readable medium" as used herein refers to any tangible storage and/or transmission medium that participate in providing instructions to a processor for execution. Such a medium may take many forms, including but not limited to, non-volatile media, volatile media, and transmission media. Non-volatile media includes, for example, NVRAM, or magnetic or optical disks. Volatile media includes dynamic memory, such as main memory. Common forms of computer-readable media may include, for example, a floppy disk, a flexible disk, hard disk, magnetic tape, or any other magnetic medium, magneto-optical medium, a CD-ROM, any other optical medium, punch cards, paper tape, any other physical medium with patterns of holes, a RAM, a PROM, and EPROM, a FLASH-EPROM, a solid state medium like a memory card, any other memory chip or cartridge, a carrier wave as described hereinafter, or any other medium from which a computer can read.

The terms "customer" and "contact" may be used interchangeably in certain context of this disclosure of the present invention when referring to one or more persons/entity contacting a contact center, usually to reach an IVR system and/or one or more agents for assistance. In another context contemplated by the present invention, a "customer" may have more than one contact with the contact center at, or nearly at, the same time. For example, a customer may communicate with a contact center by way of telephone and by way of a chat, thus counting as one customer but two contacts.

The terms "agent" and "resource" may be used interchangeably in certain context of this disclosure of the present invention when referring to one or more persons/entity servicing a contact in a contact center or a knowledge resource within an enterprise servicing back office transactions. In an embodiment of the present invention, the resource may be, but is not restricted to, an agent, an available agent, a reserve agent, a trainee agent, a Subject Matter Expert (SME), a supervisor, and so forth.

A digital file attachment to e-mail or other self-contained information archive or set of archives is considered a distribution medium equivalent to a tangible storage medium. When the computer-readable media is configured as a database, it is to be understood the database may be any type of database, such as relational, hierarchical, object-oriented, and/or the like. Accordingly, embodiments may include a tangible storage medium or distribution medium and prior art-recognized equivalents and successor media, in which the software embodiments of the present invention are stored.

The terms "determine", "calculate" and "compute," and variations thereof, as used herein, are used interchangeably and include any type of methodology, process, mathematical operation or technique.

The term "module" as used herein refers to any known or later developed hardware, software, firmware, artificial intelligence, fuzzy logic, or combination of hardware and software that is capable of performing the functionality associated with that element. Also, while the present invention is described in terms of exemplary embodiments, it should be appreciated those individual aspects of the present invention can be separately claimed.

The term "switch" or "server" as used herein should be understood to include a Private Branch Exchange (PBX), an ACD, an enterprise switch, or other type of communications system switch or server, as well as other types of processor-based communication control devices such as media servers, computers, adjuncts, etc.

Figure 1A:
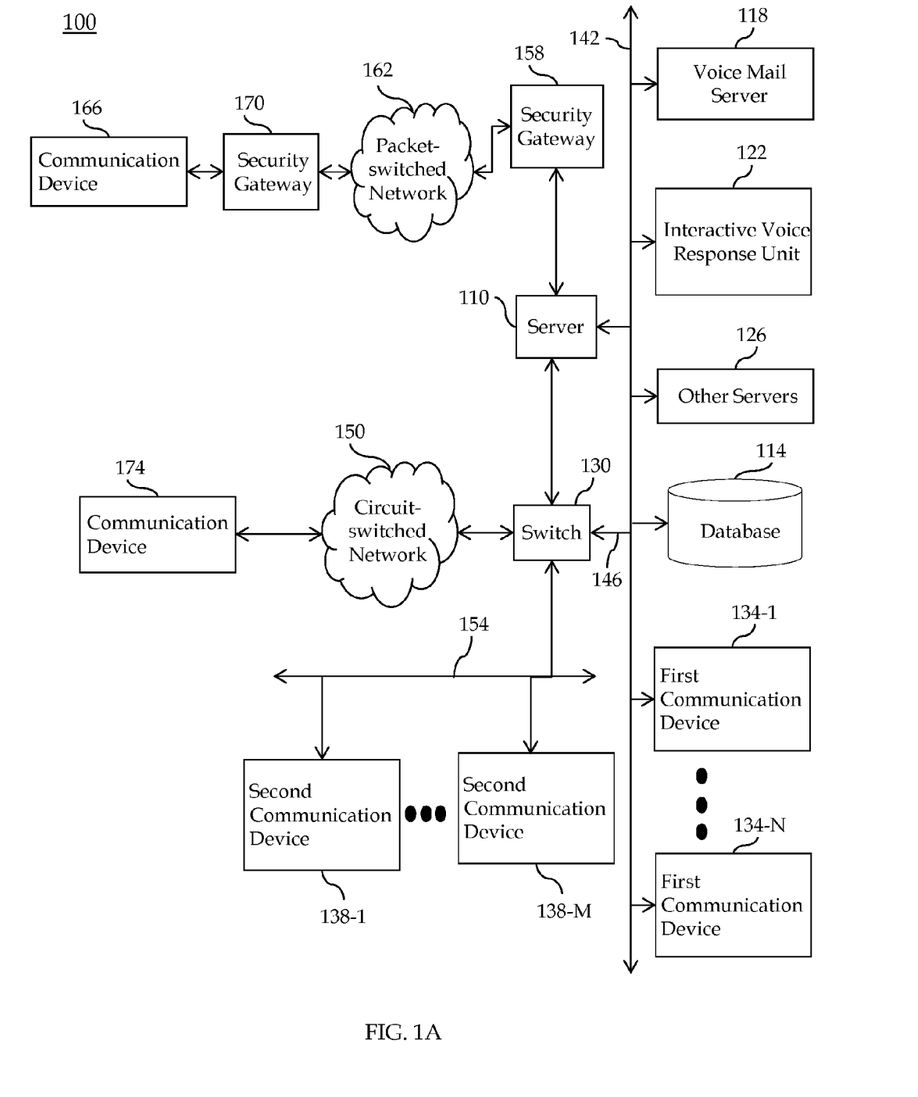
FIG. 1A illustrates a block diagram depicting a contact center, according to an embodiment of the present invention.

FIG. 1A shows an illustrative embodiment of the present invention. A contact center 100 comprises a server 110, a set of data stores or databases 114 containing contact or customer related information, resource or agent related information, and other information that may enhance the value and efficiency of the contact processing. The contact center 100 further comprises a plurality of servers, namely a voice mail server 118, an Interactive Voice Response unit (e.g., IVR) 122, and other servers 126, a switch 130, a plurality of working agents operating packet-switched (first) communication devices 134-1-N (such as computer work stations or personal computers), and/or circuit-switched (second) communication devices 138-1-M, all interconnected by a Local Area Network (LAN) 142, (or Wide Area Network (WAN)). In another embodiment of the present invention, the customer and agent related information may be replicated over multiple repositories.

The plurality of servers may be connected via optional communication lines 146 to the switch 130. As will be appreciated, the other servers 126 may also include, but is not restricted to, a scanner (which is normally not connected to the switch 130 or Web Server), a Voice over Internet Protocol (VoIP) software, a video call software, a voice messaging software, an Internet Protocol (IP) voice server, a fax server, a web server, an email server, and the like. The switch 130 is connected via a plurality of trunks to a circuit-switched network 150 (e.g., Public Switch Telephone Network (PSTN)) and via link(s) 154 to the second communication devices 138-1-M. A security gateway 158 is positioned between the server 110 and a packet-switched network 162 to process communication sessions passing between the server 110 and the packet-switched network 162. In an embodiment of the present invention, the security gateway 158 (as shown in FIG. 1A) may be Avaya Inc.'s, G700 Media Gateway™ and may be implemented as hardware such as via an adjunct processor (as shown) or as a chip in the server 110.

The switch 130 and/or server 110 may be any architecture for directing incoming contacts to one or more communication devices. In some embodiments of the present invention, the switch 130 may perform load-balancing functions by allocating incoming or outgoing contacts among a plurality of logically and/or geographically distinct contact centers. Illustratively, the switch 130 and/or server 110 may be a modified form of subscriber-premises equipment sold by Avaya Inc. under the names Definity™ Private-Branch Exchange (PBX) based ACD system, MultiVantage™ PBX, Communication Manager™, S8300™ media server and any other media servers, SIP Enabled Services™, Intelligent Presence Server™, and/or Avaya Interaction Center™, and any other products or solutions offered by Avaya, or another company. Typically, the switch 130/server 110 is a stored-program-controlled system that conventionally includes interfaces to external communication links, a communications switching fabric, service circuits (e.g., tone generators, announcement circuits, etc.), memory for storing control programs and data, and a processor (i.e., a computer) for executing the stored control programs to control the interfaces and the fabric and to provide ACD functionality. Other types of known switches and servers are well known in the art and therefore not described in detail herein.

The first communication devices 134-1-N are packet-switched and may include, for example, IP hardphones such as the Avaya Inc.'s, 4600 Series IP Phones™, IP softphones such as Avaya Inc.'s, IP Softphone™, Personal Digital Assistants (PDAs), Personal Computers (PCs), laptops, packet-based H.320 video phones and conferencing units, packet-based voice messaging and response units, packet-based traditional computer telephony adjuncts, peer-to-peer based communication devices, and any other communication device.

The second communication devices 138-1-M are circuit-switched devices. Each of the second communication devices 138-1-M corresponds to one of a set of internal extensions Ext-1-M, respectively. The second communication devices 138-1-M may include, for example, wired and wireless telephones, PDAs, H.320 videophones and conferencing units, voice messaging and response units, traditional computer telephony adjuncts, and any other communication devices.

It should be noted that the embodiments of present invention do not require any particular type of information transport medium between switch, or server and first and second communication devices, i.e., the embodiments of the present invention may be implemented with any desired type of transport medium as well as combinations of different types of transport channels.

The packet-switched network 162 may be any data and/or distributed processing network, such as the Internet. The packet-switched network 162 typically includes proxies (not shown), registrars (not shown), and routers (not shown) for managing packet flows.

The packet-switched network 162 as shown in FIG. 1A is in communication with a first communication device 166 via a security gateway 170, and the circuit-switched network 150 with an external second communication device 174.

In one configuration, the server 110, the packet-switched network 162, and the first communication devices 134-1-N are Session Initiation Protocol (SIP) compatible and may include interfaces for various other protocols such as the Lightweight Directory Access Protocol (LDAP), H.248, H.323, Simple Mail Transfer Protocol (SMTP), Internet Message Access Protocol 4 (IMAP4), Integrated Services Digital Network (ISDN), E1/T1, and analog line or trunk.

It should be emphasized the configuration of the switch 130, the server 110, user communication devices, and other elements as shown in FIG. 1A is for purposes of illustration only and should not be construed as limiting embodiments of the present invention to any particular arrangement of elements.

Further, the server 110 is notified via the LAN 142 of an incoming contact by the communications component (e.g., switch 130, a fax server, an email server, a web server, and/or other servers) receiving the incoming contact as shown in FIG. 1A. The incoming contact is held by the receiving telecommunications component until the server 110 forwards instructions to the component to forward or route the incoming contact to a specific contact center resource, such as the IVR unit 122, the voice mail server 118, and/or first or second telecommunication device 134-1-N, 138-1-M associated with a selected resource.

Figure 1B:
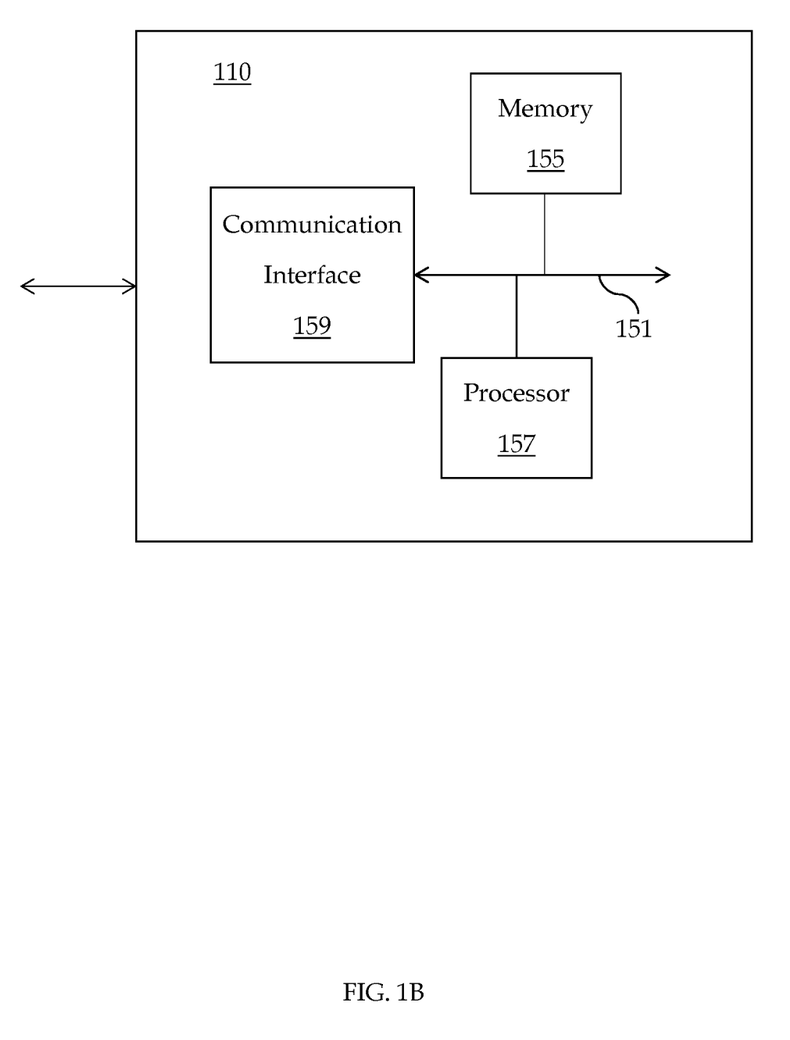
FIG. 1B illustrates a high level hardware abstraction of a block diagram of a server, according to an embodiment of the present invention.

FIG. 1B illustrates at a relatively high-level hardware abstraction of a block diagram of a server such as the server 110, in accordance with an embodiment of the present invention. The server 110 may include, but is not restricted to, an internal communication interface 151 that interconnects a processor 157, a memory 155 and a communication interface circuit 159. The communication interface circuit 159 may include a receiver and transmitter (not shown) to communicate with other elements of the contact center 100 such as the switch 130, the security gateway 158, the LAN 142, and so forth. By use of programming code and data stored in the memory 155, the processor 157 may be programmed to carry out various functions of the server 110.

Although embodiments of the present invention are discussed with reference to client-server architecture, it is to be understood the principles of embodiments of the present invention may also apply to other network architectures. For example, embodiments of the present invention may apply to peer-to-peer networks, such as those envisioned by the Session Initiation Protocol (SIP). In the client-server model or paradigm, network services and the programs used by end users to access the services are described. The client side provides a customer with a communication interface for requesting services from the network, and the server side is responsible for accepting customer requests for services and providing the services transparent to the customer. By contrast in the peer-to-peer model or paradigm, each networked host runs both the client and server parts of an application program. Additionally, embodiments of the present invention do not require the presence of packet- or circuit-switched networks.

Figure 2:
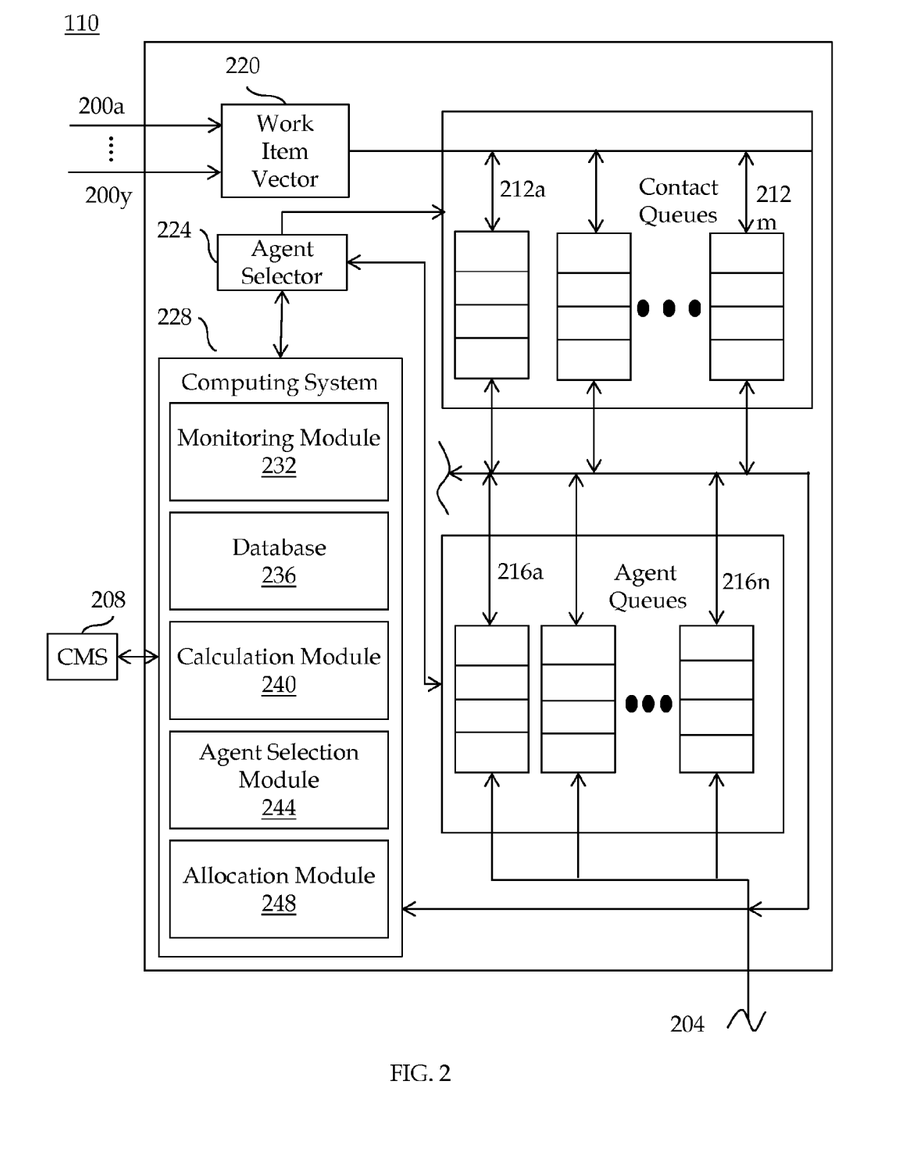
FIG. 2 illustrates a functional block diagram of the server that may be used in the contact center, according to an embodiment of the present invention.

Referring to FIG. 2, one possible configuration of the server 110 is depicted at a relatively high level of functional abstraction, according to an embodiment of the present invention. The server 110 is in communication with a plurality of contact or customer communication lines 200a-y (which may be one or more trunks, phone lines, etc.) and an agent communication line 204 (which may be a voice-and-data transmission line such as the LAN 142 and/or a circuit switched voice line). The server 110 may include Avaya Inc.'s Operational Analyst™ (OA) with On-Line Analytical Processing (OLAP) technology or a Call Management System (CMS) 208 that gathers contact records. OA and CMS will hereinafter be referred to jointly as CMS 208.

As shown in FIG. 2, among the data stored in the server 110 is a set of contact or work item queues 212a-m and a separate set of agent queues 216a-n. Each contact queue 212a-m corresponds to a different set of agent queues, as does each agent queue 216a-n. Conventionally, incoming contacts either are prioritized or are queued in individual ones of the contact queues 212a-m in their order of priority or are queued in different ones of a plurality of contact queues 212a-m that correspond to a different priority. Likewise, each agent's queues are prioritized according to his or her level of expertise or skill in that queue, and agents are queued in either individual ones of agent queues 216a-n in their order of expertise level or in different ones of a plurality of agent queues 216a-n that correspond to a queue and each one of which corresponds to a different expertise level. In an embodiment of the present invention, the agent queue 216a-n may include a set of reserve agents queue in the contact center 100.

According to an embodiment of the present invention, included among the control programs in the server 110 is a work item vector 220. Contacts incoming to the contact center 100 are assigned by the work item vector 220 to different contact queues 212a-n based upon a number of predetermined criteria, including, but are not limited to, a customer's identity, customer needs, contact center needs, current contact center queue lengths, a customer value, and an agent skill that is required for proper handling of the contact. Agents who are available for handling the contacts are assigned to the agent queues 216a-n based upon the skills and/or attributes that they possess. A resource may have multiple skills and/or attributes, and therefore may be assigned to multiple agent queues 216a-n simultaneously. Furthermore, a resource may have different levels of skill expertise (e.g., skill levels 1-N in one configuration or merely primary skill levels and secondary skill levels in another configuration), and therefore may be assigned to different agent queues 216a-n at different expertise levels.

In one configuration, the contact center 100 is operated by a contact center operator (e.g., a supervisor or a manager of the contact center 100), and each of the contact queues 212a-m, and possibly each of the agent queues 216a-n, corresponds to a different client. Each client may have a separate Service Level Agreement (SLA) or other type of performance measurement agreement with the contact center operator regarding performance expectations, business goals, business strategies, requirements or specifications for the client's respective queue(s).

Further, embodiments in accordance with the present invention may include, among the programs executing on the server 110, an agent selector 224 and a computing system 228. The agent selector 224 and the computing system 228 are stored either in the main memory or in a peripheral memory (e.g., disk, CD ROM, etc.) or some other computer-readable medium of the contact center 100. Further, the agent selector 224 monitors the occupants of the contact and agent queues 212a-m and 216a-n, respectively, and contact center objectives, goals, strategies, rules and policies, and assigns resources to service incoming contacts.

The agent selector 224 distributes and connects these contacts to communication devices of available resources based on the predetermined criteria noted above. When the agent selector 224 forwards a contact (or first work item) to a resource, the agent selector 224 also forwards customer-related information from the database 114 to the resource's desktop or computer work station for previewing and/or viewing (such as by a pop-up display) to enable the resource for providing better services to the contact. Depending on the contact center configuration, the agent selector 224 may reallocate the contacts to the resources of the contact center 100. The resources' process the contacts sent to them by the agent selector 224.

In an embodiment of the present invention, the resource and their associated data are maintained and updated in the database 114 of the contact center 100. Upon the completion of handling an incoming contact, a generator (not shown) collects selected metrics for the contact. These metrics may include, but is not restricted to, skills involved in servicing the contact, an identifier of a servicing resource, contact duration, a transaction or contact type (e.g., sale, information request, complaint, etc.), time-of-day, result of the contact (e.g., type of sale, number of units sold, an average revenue generated, etc.), and so forth. The metrics along with other statistics is typically gathered by the CMS 208.

According to an embodiment of the present invention, the computing system 228 includes certain modules such as but is not restricted to, a monitoring module 232, a database 236, a calculation module 240, an agent selection module 244, and an allocation module 248. In some embodiments of the present invention, one or more of the monitoring module 232, the database 236, the calculation module 240, the agent selection module 244, and the allocation module 248 may be implemented by one or more software processes running on the server 110. The server 110 may implement one or more software processes by use of the processor 157 being suitably programmed by use of software instructions stored in the memory 155 coupled to the processor 157.

The monitoring module 232 may monitor parameters associated with a communication session, according to an embodiment of the present invention. In an embodiment of the present invention, the parameters of the communication session may include, but are not restricted to, a state of a resource, a state of a contact center, and a state of a communication session.

The monitoring module 232 may monitor the state of a resource by monitoring current communication sessions managed by the resource, in an embodiment of the present invention. In an exemplary scenario, the monitoring module 232 may monitor that a resource of the contact center 100 may manage multiple communication sessions simultaneously, for example, one voice session, two web chat sessions, and three instant messaging sessions. Further, the monitoring module 232 may monitor difficulty level of the communication sessions, i.e., whether the communication session is complex or trivial, allocated to the resource. In an exemplary scenario, a customer may ask for a frequently asked question such as "how to get a catalog for a mobile phone?" then it is determined that difficulty level of a communication session is simple and may take less time in completing the communication session. The monitoring module 232 may monitor various other factors associated with the state of the resource, for example, but are not restricted to, time taken by a resource for completing communication sessions, type of media resources used by a resource for handling communication sessions, availability of media resources to be used by a resource, and so forth.

Furthermore, the monitoring module 232 may monitor state of the resource by monitoring sentiments of the resource while providing services to customers, in an embodiment of the present invention. The sentiment may include, but is not restricted to, a positive sentiment, a negative sentiment, a neutral sentiment, and so forth. The monitoring module 232 may also monitor a profile of a resource of the contact center 100, in an embodiment of the present invention. The profile of the resource may include a resource's self-description, skill sets, likes, locations, and so forth. The resource's skill set may include, but is not limited to, a resource's interests, education and work histories, technical training, experience in supporting a particular industry, company, or contact, and so forth. The resource skill set may also include, but is not limited to, hobbies, hometowns, favorite sport teams and TV shows, cultural background, and so on, to the extent that such information may be relevant to support of customers to the contact center 100. In an embodiment of the present invention, the resource profile may be stored and maintained in a database such as the database 114, or the database 236 of the contact center 100.

As user herein, the term "skill set" refers to a set of resource data that may be used by the contact center 100 to characterize a resource. Such resource data may include, but is not limited to, biographical resource data, demographic resource data, and external or internal behavioural resource data, to name a few. The behavioural data may include the resource's history with respect to the contact center 100 and/or any other entity or social media channel. However, the resource data is not limited in this regard and may include any other type of resource data used by the contact center 100 to characterize or classify resources. Further, the resource data may include any other resource data collected from one or more sources external to the contact center 100. Additionally, a resource profile may be raw data or processed resource data. That is, the resource data may be analysed to characterize the resource and thereafter used to provide customized or personalized services to the customer. For example, a resource profile may be a set of values associated with a resource and a set of characteristics, where the values may be selected based on the resource data obtained. However, the disclosure is not limited in this regard and any other methods for evaluating resource data to provide services that may be used without limitation.

Furthermore, the monitoring module 232 may monitor the state of the communication session by monitoring a type of the communication session, according to an embodiment of the present invention. The type of the communication session, i.e., whether the communication session made by a customer is, but is not restricted to, a video session, a voice session, a Voice over Internet Protocol (VoIP), a text message, an email, an instant messaging, a web chat, and so forth. The communication session may be an incoming communication session, in an embodiment of the present invention. Further, the monitoring module 232 may monitor a type of the customer associated with the communication session, according to an embodiment of the present invention. In an exemplary scenario, a customer may be, but is not restricted to, a platinum customer or a high priority customer, a gold customer or a medium priority customer, and/or a silver customer or a low priority customer. A customer having higher revenue products and/or services of the contact center 100 may be referred as a high priority customer. A customer having medium revenue products and/or services of the contact center 100 may be referred as a medium priority customer. Further, a customer having low revenue products and/or services or is a potential customer of the contact center 100 may be referred as a low priority customer.

The monitoring module 232 may further monitor context of the communication session by monitoring static details, for example, inputs selected by the customer in an Interactive Voice Response (IVR) menu of the contact center 100, in an embodiment of the present invention. In an exemplary scenario, a customer may select a button '3' for 'English' language in an IVR menu, may select a button '5' for 'mobile phone', and further may select a button '9' for an 'inquiry', then it may be determined that the customer desires to inquire about a mobile phone in English language. In another embodiment of the present invention, the monitoring module 232 may monitor context of the communication session by monitoring browsing history of the customer. In yet another embodiment of the present invention, the context of the communication session may be monitored by extracting keywords from the communication session.

Furthermore, the monitoring module 232 may monitor the state of the communication session by monitoring sentiments of the customer associated with the communication session, in an embodiment of the present invention. The sentiment may include, but is not restricted to, a positive sentiment, a negative sentiment, a neutral sentiment, and so forth. The positive sentiment may indicate that the customer is happy and satisfy from customer services provided by the contact center 100. Examples of the positive sentiment may be, but is not restricted to, fulfilled, glad, optimistic, and so forth. The negative sentiment may indicate that the customer is unhappy and unsatisfied from customer services provided by the contact center 100. Examples of the negative sentiment may be, but is not restricted to, frustrated, angry, irritated, and so forth. The neutral sentiment may indicate that the customer is not fully satisfied or happy but is not fully unsatisfied or unhappy from the customer services provided by the contact center 100. The monitoring module 232 may monitor the state of the communication session by monitoring various other factors, for example, a profile of a customer, associated with the communication session such as, but is not limited to, a name of a customer, an address, an email address, a telephone number, transaction history, and so forth. Further, the monitoring module 232 may monitor the state of the communication session by monitoring a difficulty level of the communication session, according to an embodiment of the present invention. In an exemplary scenario, the monitoring module 232 may monitor that an urgent communication session that is complex is received by the contact center 100, which is to be serviced in a short period of time.

Further, the monitoring module 232 may monitor the state of the contact center 100, according to an embodiment of the present invention. For example, the monitoring module 232 may monitor the state of the contact center 100 by monitoring various factors associated with the contact center 100, for example, but are not restricted to, number of communication sessions yet to be allocated to resources, number of communication sessions managed by resources, availability of resources, availability of resources to accept more communication sessions, and so forth.

The monitored parameters of the communication session are then stored in a database such as the database 114, or the database 236, in an embodiment of the present invention.

The calculation module 240 may dynamically calculate a multiplicity value for each of the resources within the contact center 100, according to an embodiment of the present invention. The multiplicity of a resource may be defined as an ability of a resource to handle multiple communication sessions at a same time. The communication sessions may be of different type, such as but is not limited to, a voice session, a video session, a web chat session, an email session, and so forth. In an exemplary scenario, a resource may manage a video session and a web chat session simultaneously. The multiplicity of a resource may be used in order to improve customer experience, and to enhance productivity and efficiency of the resource in the contact center 100.

The calculation module 240 may calculate the multiplicity value for each of the resources based on the stored parameters, in an embodiment of the present invention. In an exemplary scenario, an agent 'A' may be currently managing a voice session, two email sessions and four web chat sessions, and an agent 'B' may be currently managing two web chat sessions, and four email sessions. An incoming communication session may be a video session, then a multiplicity value, for example, six, may be calculated for the agent 'A' whereas a multiplicity value, for example, nine, may be calculated for the agent 'B'.

In another exemplary scenario, two web chat sessions waiting in a queue for an agent 'A' are similar to a chat session currently managed by the agent 'A', and may take less time for completing the web chat sessions. The calculation module 240 may then determine that the agent 'A' may also manage a voice session at the same time by a customer of the web chat session currently managed by the agent 'A', then a multiplicity value 'five' may be computed for the agent 'A'.

The calculation module 240 may dynamically calculate the multiplicity value for each of the resources based on a predefined set of rules, according to another embodiment of the present invention. The predefined set of rules may include, but are not limited to, business strategies or business processes of the contact center 100, in an embodiment of the present invention. In an exemplary scenario, the business strategy may be, but is not limited to, a work selection strategy, or a resource selection strategy.

In another embodiment of the present invention, the calculation module 240 may dynamically calculate the multiplicity value for each of the resources of the contact center 100 based on a difficulty level of an incoming communication session and an expertise level of the resources, for example, but is not restricted to, highly skilled, low skilled, trainee, and so forth. In an exemplary scenario, if difficulty level of a communication session is monitored as complex then a multiplicity value for a Subject Matter Expert (SME) may be calculated as '10' and a multiplicity value for a trainee resource may be calculated as '2'.

The agent selection module 244 may select a resource from the resources to manage the communication session, according to an embodiment of the present invention. The agent selection module 244 may select a resource based on the calculated multiplicity value, in an embodiment of the present invention. In an exemplary scenario, an agent 'A' may have a calculated multiplicity value '5' and an agent 'B' may have a calculated multiplicity value '4' then the agent 'A' having more multiplicity value may be selected. In an embodiment of the present invention, the agent selection module 244 may select a resource based on the calculated multiplicity value, the predefined set of rules, or a combination thereof. In an embodiment of the present invention, the agent selection module 244 may enable a supervisor of the contact center 100 to select a resource manually in order to manage the communication session. In another embodiment of the present invention, the agent selection module 244 may automatically select a resource to manage the communication session. In an embodiment of the present invention, the resource may be, but is not restricted to, an agent, an available agent, a reserve agent, a trainee agent, a Subject Matter Expert (SME), a supervisor, and so forth.

The allocation module 248 may allocate the communication session to one of a resource from the resources of the contact center 100 based on the calculated multiplicity value, according to an embodiment of the present invention. Based on the multiplicity value of the resources, the communication sessions are routed to a resource whose characteristics match with the monitored parameters of the communication session. In an exemplary scenario, a multiplicity value of an agent is calculated as five and the agent is currently handling a web chat session of a low priority customer. An incoming communication session may be a video session of a high priority customer then the communication session (i.e., video session) may be allocated to that agent. In an embodiment of the present invention, the resource may be, but is not restricted to, an agent, an available agent, a reserve agent, a trainee agent, a Subject Matter Expert (SME), a supervisor, and so forth.

Figure 3:
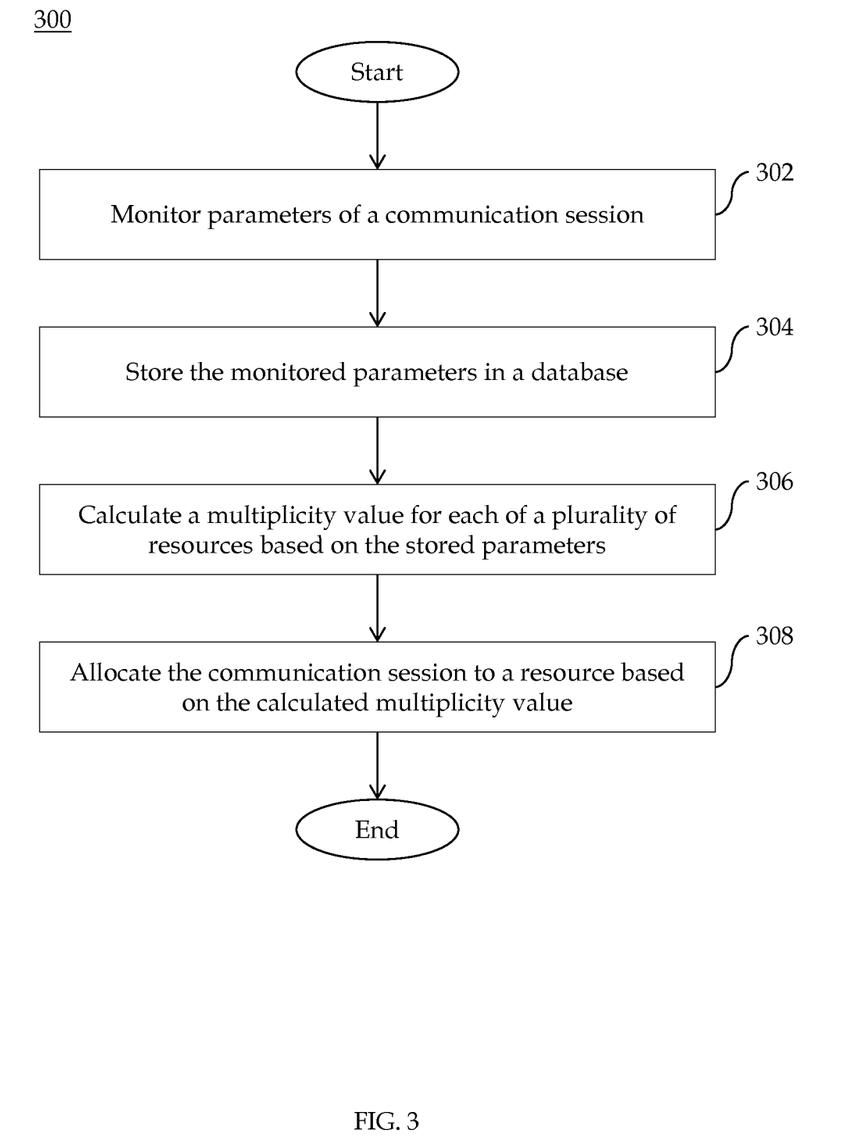
FIG. 3 depicts a flowchart of a method for managing resources for communication sessions in the contact center, according to an embodiment of the present invention.

FIG. 3 depicts a flowchart of a method for managing resources for communication sessions in the contact center 100, according to an embodiment of the present invention.

At step 302, a computing system 228 monitors parameters associated with a communication session, according to an embodiment of the present invention. In an embodiment of the present invention, the parameters of the communication session may include, but are not restricted to, a state of a resource, a state of a contact center, and a state of a communication session.

In an embodiment of the present invention, the state of a resource may include, but is not limited to, sentiment of a resource, current communication sessions managed by a resource, difficulty level of communication sessions allocated to a resource, a profile of a resource, time taken by a resource to complete a communication session, types of media resources used by a resource to handle communication sessions, availability of media resources to be used by a resource, and so forth.

In an embodiment of the present invention, the state of a contact center 100 may include, but is not limited to, number of communication sessions yet to be allocated to resources, number of communication sessions managed by resources, availability of resources, availability of resources to accept more communication sessions, and so forth.

The state of the communication session may include, but is not limited to, a type of a communication session, a type of a customer associated with a communication session, context of a communication session, sentiments of a customer, a profile of a customer, difficulty level of a communication session, and so forth, in an embodiment of the present invention. At step 304, the computing system 228 stores the monitored parameters in a database, according to an embodiment of the present invention. The monitored parameters of the communication session are stored in a database such as the database 114, or the database 236, in an embodiment of the present invention.

Next, at step 306, the computing system 228 dynamically calculates a multiplicity value for each of the resources within the contact center 100, according to an embodiment of the present invention. The computing system 228 dynamically calculates the multiplicity value for each of the resources based on the stored parameters, in an embodiment of the present invention. In an exemplary scenario, an agent 'A' may be currently managing a video session, two instant messaging sessions and four email sessions, and an agent 'B' may be currently managing two email sessions, and four instant messaging sessions. An incoming communication session may be a web chat session then a multiplicity value, for example, five, may be calculated for the agent 'A' and a multiplicity value, for example, six, may be calculated for the agent 'B'.

The computing system 228 dynamically calculates the multiplicity value for each of the resources based on a predefined set of rules, according to another embodiment of the present invention. The predefined set of rules may include, but are not limited to, business strategies or business processes of the contact center 100, in an embodiment of the present invention. In an exemplary scenario, the business strategy may be, but is not limited to, a work selection strategy, or a resource selection strategy.

In an embodiment of the present invention, the computing system 228 dynamically calculates the multiplicity value for each of the resources of the contact center 100 based on a difficulty level of a communication session and an expertise level of the resources, for example, highly skilled, low skilled, trainee, and so forth. In an exemplary scenario, if difficulty level of a communication session may be monitored as trivial then may be a multiplicity value for a Subject Matter Expert (SME) may be calculated as one and a multiplicity value for a trainee agent may be calculated as six.

At step 308, the computing system 228 allocates the communication session to one of a resource of the resources of the contact center 100 based on the calculated multiplicity value, according to an embodiment of the present invention. Based on the multiplicity value of the resources, the communication sessions may be allocated to resources whose characteristics match with the monitored parameters of the communication sessions. In an exemplary scenario, a multiplicity value of an agent may be calculated as four and the agent may be currently handling a voice session of a low priority customer. An incoming communication session may be a web chat session of a high priority customer then the communication session (i.e., web chat session) may be allocated to that agent. In an embodiment of the present invention, the resource may be, but is not restricted to, an agent, an available agent, a reserve agent, a trainee agent, a Subject Matter Expert (SME), a supervisor, and so forth.

Figure 4:
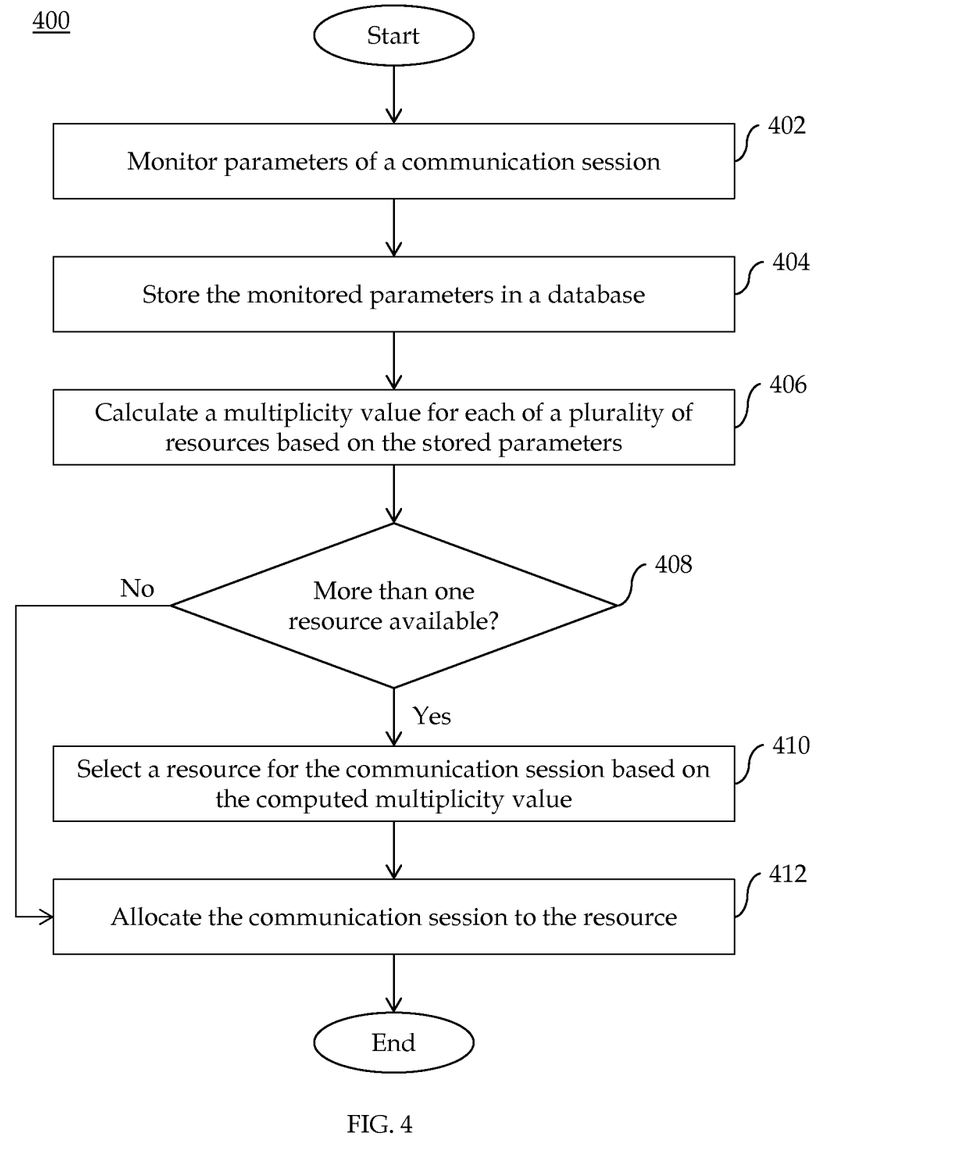
FIG. 4 depicts a flowchart of a method for managing resources for communication sessions in the contact center, according to another embodiment of the present invention.

FIG. 4 depicts a flowchart of a method 400 for managing resources for communication sessions in the contact center 100, according to another embodiment of the present invention.

At step 402, a computing system 228 monitors parameters associated with a communication session, according to an embodiment of the present invention. In an embodiment of the present invention, the parameters of the communication session may include, but are not restricted to, a state of a resource, a state of a contact center, and a state of a communication session.

In an embodiment of the present invention, the state of a resource may include, but is not limited to, sentiments of a resource, current communication sessions managed by a resource, difficulty level of communication sessions allocated to a resource, a profile of a resource, time taken by a resource to complete a communication session, types of media resources used by a resource to handle communication sessions, availability of media resources to be used by a resource, and so forth.

In an embodiment of the present invention, the state of a contact center may include, but is not limited to, number of communication sessions yet to be allocated to resources, number of communication sessions managed by resources, availability of resources, availability of resources to accept more communication sessions, and so forth.

The state of the communication session may include, but is not limited to, a type of a communication session, a type of a customer associated with a communication session, context of a communication session, sentiments of a customer, a profile of a customer, difficulty level of a communication session, and so forth, in an embodiment of the present invention. At step 404, the computing system 228 stores the monitored parameters of the communication session in a database, according to an embodiment of the present invention. The monitored parameters of the communication session are stored in a database such as the database 114, or the database 236, in an embodiment of the present invention.

Next, at step 406, the computing system 228 dynamically calculates a multiplicity value for each of the resources within the contact center 100, according to an embodiment of the present invention. The computing system 228 dynamically calculates the multiplicity value for each of the resources based on the stored parameters associated with the communication session, in an embodiment of the present invention. In an exemplary scenario, an agent 'A' may be currently managing a video session, and four email sessions, and an agent 'B' may be currently managing two email sessions, and four instant messaging sessions. An incoming communication session may be a voice session then a multiplicity value, for example, three, may be calculated for the agent 'A' whereas a multiplicity value, for example, six, may be calculated for the agent 'B', as the agent 'A' may not manage two voice sessions simultaneously.

The computing system 228 dynamically calculates the multiplicity value for each of the resources based on a predefined set of rules, according to another embodiment of the present invention. The predefined set of rules may include, but are not limited to, business strategies or business processes of the contact center 100, in an embodiment of the present invention. In an exemplary scenario, the business strategy may be, but is not limited to, a work selection strategy, or a resource selection strategy.

Further, at step 408, the computing system 228 determines whether more than one resource is available for managing the communication session, according to an embodiment of the present invention. If it is determined that more than one resource is available for handling the communication session, the method 400 proceeds towards step 410. If it is determined that only one resource is available in the contact center 100 for handling the communication session, then the method 400 proceeds towards step 412.

Thereafter, at step 410, the computing system 228 selects a resource based on the calculated multiplicity value for each of the resources, according to an embodiment of the present invention. In an exemplary scenario, an agent 'A' may have a calculated multiplicity value of four and an agent 'B' may have a calculated multiplicity value of seven, then the agent 'A' having more multiplicity value may be selected. In an embodiment of the present invention, the computing system 228 selects a resource based on the calculated multiplicity value, the predefined set of rules, or a combination thereof.

At step 412, the computing system 228 allocates the communication session to one of a resource of the contact center 100 based on the calculated multiplicity value, according to an embodiment of the present invention. Based on the dynamic calculated multiplicity values of the resources, the communication sessions are routed to resources whose characteristics match with the monitored parameters associated with the communication sessions. In an exemplary scenario, a multiplicity value of an agent may be calculated as four and the agent may be currently handling a video session of a medium priority customer. An incoming communication session may be a web chat session of a high priority customer then the communication session (i.e., web chat session) may be allocated to that agent. In an embodiment of the present invention, the resource may be, but is not restricted to, an agent, an available agent, a reserve agent, a trainee agent, a Subject Matter Expert (SME), a supervisor, and so forth.

The exemplary embodiments of this present invention have been described in relation to a contact center. However, to avoid unnecessarily obscuring the present invention, the preceding description omits a number of known structures and devices. This omission is not to be construed as a limitation of the scope of the present invention. Specific details are set forth by use of the embodiments to provide an understanding of the present invention. It should however be appreciated that the present invention may be practiced in a variety of ways beyond the specific embodiments set forth herein.

Furthermore, while the exemplary embodiments of the present invention illustrated herein show the various components of the system collocated, certain components of the system can be located remotely, at distant portions of a distributed network, such as a LAN and/or the Internet, or within a dedicated system. Thus, it should be appreciated, that the components of the system can be combined in to one or more devices, such as a switch, server, and/or adjunct, or collocated on a particular node of a distributed network, such as an analog and/or digital telecommunications network, a packet-switch network, or a circuit-switched network.

It will be appreciated from the preceding description, and for reasons of computational efficiency, the components of the system can be arranged at any location within a distributed network of components without affecting the operation of the system. For example, the various components can be located in a switch such as a PBX and media server, gateway, in one or more communications devices, at one or more users' premises, or some combination thereof. Similarly, one or more functional portions of the system could be distributed between a telecommunications device(s) and an associated computing device.

Furthermore, it should be appreciated the various links connecting the elements can be wired or wireless links, or any combination thereof, or any other known or later developed element(s) that is capable of supplying and/or communicating data to and from the connected elements. These wired or wireless links can also be secure links and may be capable of communicating encrypted information. Transmission media used as links, for example, can be any suitable carrier for electrical signals, including coaxial cables, copper wire and fiber optics, and may take the form of acoustic or light waves, such as those generated during radio-wave and infra-red data communications.

Also, while the flowcharts have been discussed and illustrated in relation to a particular sequence of events, changes, additions, and omissions to this sequence can occur without materially affecting the operation of embodiments of the present invention.

A number of variations and modifications of the present invention can be used. It would be possible to provide for some features of the present invention without providing others.

For example in one alternative embodiment of the present invention, the systems and methods of this present invention can be implemented in conjunction with a special purpose computer, a programmed microprocessor or microcontroller and peripheral integrated circuit element(s), an ASIC or other integrated circuit, a digital signal processor, a hard-wired electronic or logic circuit such as discrete element circuit, a programmable logic device or gate array such as PLD, PLA, FPGA, PAL, special purpose computer, any comparable means, or the like.

In general, any device(s) or means capable of implementing the methodology illustrated herein can be used to implement the various aspects of this present invention. Exemplary hardware that can be used for the present invention includes computers, handheld devices, telephones (e.g., cellular, Internet enabled, digital, analog, hybrids, and others), and other hardware known in the art. Some of these devices include processors (e.g., a single or multiple microprocessors), memory, non-volatile storage, input devices, and output devices. Furthermore, alternative software implementations including, but not limited to, distributed processing or component/object distributed processing, parallel processing, or virtual machine processing can also be constructed to implement the methods described herein.

In yet another embodiment of the present invention, the disclosed methods may be readily implemented in conjunction with software using object or object-oriented software development environments that provide portable source code that can be used on a variety of computer or workstation platforms. Alternatively, the disclosed system may be implemented partially or fully in hardware using standard logic circuits or VLSI design. Whether software or hardware is used to implement the systems in accordance with embodiments of the present invention is dependent on the speed and/or efficiency requirements of the system, the particular function, and the particular software or hardware systems or microprocessor or microcomputer systems being utilized.

In yet another embodiment of the present invention, the disclosed methods may be partially implemented in software that can be stored on a storage medium, executed on programmed general-purpose computer with the cooperation of a controller and memory, a special purpose computer, a microprocessor, or the like. In these instances, the systems and methods of this present invention can be implemented as program embedded on personal computer such as an applet, JAVA® or CGI script, as a resource residing on a server or computer workstation, as a routine embedded in a dedicated measurement system, system component, or the like. The system can also be implemented by physically incorporating the system and/or method into a software and/or hardware system.

Although the present invention describes components and functions implemented in the embodiments with reference to particular standards and protocols, it is not limited to such standards and protocols. Other similar standards and protocols not mentioned herein are in existence and considered to be included in the present invention. Moreover, the standards and protocols mentioned herein and other similar standards and protocols not mentioned herein are periodically superseded by faster or more effective equivalents having essentially the same functions. Such replacement standards and protocols having the same functions are considered equivalents included in the present invention.

The present invention, in various embodiments, configurations, and aspects, includes components, methods, processes, systems and/or apparatus substantially as depicted and described herein, including various embodiments, subcombinations, and subsets thereof. Those of skill in the art will understand how to make and use the present invention after understanding the present disclosure. The present invention, in various embodiments, configurations, and aspects, includes providing devices and processes in the absence of items not depicted and/or described herein or in various embodiments, configurations, or aspects hereof, including in the absence of such items as may have been used in previous devices or processes, e.g., for improving performance, achieving ease and/or reducing cost of implementation.

The foregoing discussion of the present invention has been presented for purposes of illustration and description. It is not intended to limit the present invention to the form or forms disclosed herein. In the foregoing Detailed Description, for example, various features of the present invention are grouped together in one or more embodiments, configurations, or aspects for the purpose of streamlining the disclosure. The features of the embodiments, configurations, or aspects may be combined in alternate embodiments, configurations, or aspects other than those discussed above. This method of disclosure is not to be interpreted as reflecting an intention the present invention requires more features than are expressly recited in each claim. Rather, as the following claims reflect, inventive aspects lie in less than all features of a single foregoing disclosed embodiment, configuration, or aspect. Thus, the following claims are hereby incorporated into this Detailed Description, with each claim standing on its own as a separate embodiment of the present invention.

Moreover, though the description of the present invention has included description of one or more embodiments, configurations, or aspects and certain variations and modifications, other variations, combinations, and modifications are within the scope of the present invention, e.g., as may be within the skill and knowledge of those in the art, after understanding the present disclosure. It is intended to obtain rights which include alternative embodiments, configurations, or aspects to the extent permitted, including alternate, interchangeable and/or equivalent structures, functions, ranges or steps to those claimed, whether or not such alternate, interchangeable and/or equivalent structures, functions, ranges or steps are disclosed herein, and without intending to publicly dedicate any patentable subject matter.

What is claimed is:

1. A computing system for managing a plurality of resources for one or more communication sessions in an enterprise, the system comprising:
   a processor;
   a storage device, in communication with the processor, storing executable instructions, wherein the executable instructions when executed by the processor cause the processor to:
   for each of the plurality of resources:
      monitor one or more parameters of each communication session being managed by the resource; and
      store the one or more monitored parameters in a database;
   monitor an incoming communication session;
   dynamically calculate a respective multiplicity value, in response to the incoming communication session, for each of the plurality of resources based on the stored parameters and the incoming communication session; and
   allocate the incoming communication session to one resource of the plurality of resources based on a relative comparison between the calculated respective multiplicity values of each of the plurality of resources.

2. The system of claim 1, wherein the one or more parameters comprise one or more of a state of the plurality of resources, a state of the one or more communication sessions, a state of the enterprise, or a combination thereof.

3. The system of claim 1, wherein the executable instructions, when executed by the processor, cause the processor to dynamically calculate the respective multiplicity value for each of the plurality of resources based on at least one predefined set of rules.

4. The system of claim 3, wherein the at least one predefined set of rules comprises one or more business strategies.

5. The system of claim 3, wherein each respective multiplicity value is calculated based on the one or more stored parameters, the at least one predefined set of rules, or a combination thereof.

6. The system of claim 1, wherein the executable instructions, when executed by the processor, cause the processor to select the one resource of the plurality of resources based on the respective calculated multiplicity values.

7. The system of claim 5, wherein the executable instructions, when executed by the processor, cause the processor to permit a supervisor to manually select the one resource from the plurality of resources.

8. A computer-implemented method for dynamically managing a plurality of resources for one or more communication sessions in an enterprise, the method comprising:
   for each of the plurality of resources:
      monitoring, by a computer system of the enterprise, one or more parameters of each communication session being managed by the resource; and
      storing, by the computer system of the enterprise, the one or more monitored parameters in a database;
   monitoring, by the computer system of the enterprise, an incoming communication session;
   in response to the incoming communication session, dynamically calculating, by the computer system of the enterprise, a respective multiplicity value for each of the plurality of resources based on the stored parameters and the incoming communication session; and
   allocating, by the computer system of the enterprise, the incoming communication session to one resource of the plurality of resources based on a relative comparison between the calculated respective multiplicity values of each of the plurality of resources.

9. The method of claim 8, wherein the one or more parameters comprise one or more of a state of the plurality of resources, a state of the communication session, a state of the enterprise, or a combination thereof.

10. The method of claim 8, wherein dynamically calculating comprises:
calculating the respective multiplicity value for each of the plurality of resources based on a predefined set of rules.

11. The method of claim 10, wherein the at least one predefined set of rules comprises one or more business strategies.

12. The method of claim 10, wherein each respective multiplicity value is calculated based on the one or more stored parameters, the at least one predefined set of rules, or a combination thereof.

13. The method of claim 8, further comprising:
selecting, by the computer system of the enterprise, the one resource of the plurality of resources based on the respective calculated multiplicity values.

14. The method of claim 12, further comprising:
permitting, by the computer system of the enterprise, a supervisor to manually select the one resource from the plurality of resources.

15. A computer-implemented method for dynamically allocating an incoming communication session to one resource from among a plurality of resources in an enterprise, the method comprising:
for each of the plurality of resources:
monitoring, by a computer system of the enterprise, one or more parameters of each communication session being managed by the resource; and
storing, by the computer system of the enterprise, the one or more monitored parameters in a database;
monitoring, by the computer system of the enterprise, an incoming communication session;
in response to the incoming communication session, dynamically calculating, by the computer system of the enterprise, a respective multiplicity value for each of the plurality of resources based on the stored parameters and the incoming communication session;
selecting, by the computer system of the enterprise, the one resource of the plurality of resources based on a relative comparison between the calculated respective multiplicity values of each of the plurality of resources; and
allocating, by the computer system of the enterprise, the incoming communication session to the one selected resource.

16. The method of claim 15, wherein the one or more parameters comprise one or more of a state of the plurality of resources, a state of one or more communication sessions managed by the plurality of resources, a state of the enterprise, or a combination thereof.

17. The method of claim 15, further comprising:
calculating, by the computer system of the enterprise, the respective multiplicity value for each of the plurality of resources based on a predefined set of rules.

18. The method of claim 17, wherein the at least one predefined set of rules comprises one or more business strategies.

19. The method of claim 17, wherein each respective multiplicity value is calculated based on the one or more stored parameters, the at least one predefined set of rules, or a combination thereof.

20. The method of claim 15, further comprising:
permitting, by the computer system of the enterprise, a supervisor to manually select the one resource from the plurality of resources.

* * * * *